(12) United States Patent
Shtilman et al.

(10) Patent No.: US 11,163,736 B2
(45) Date of Patent: Nov. 2, 2021

(54) SYSTEM AND METHOD FOR IN-MEMORY INDEXING OF DATA

(71) Applicant: Avaya Inc., Basking Ridge, NJ (US)

(72) Inventors: Ariel Shtilman, Tel Aviv (IL); Arkady Karpman, Hod Hasharon (IL)

(73) Assignee: Avaya Inc., Basking Ridge, NJ (US)

( * ) Notice: Subject to any disclaimer, the term of this patent is extended or adjusted under 35 U.S.C. 154(b) by 1372 days.

(21) Appl. No.: 14/194,222

(22) Filed: Feb. 28, 2014

(65) Prior Publication Data

US 2014/0250072 A1  Sep. 4, 2014

Related U.S. Application Data

(60) Provisional application No. 61/772,275, filed on Mar. 4, 2013.

(51) Int. Cl.
*G06F 16/22* (2019.01)
*G06F 16/27* (2019.01)

(52) U.S. Cl.
CPC ........ *G06F 16/2228* (2019.01); *G06F 16/275* (2019.01)

(58) Field of Classification Search
CPC ......... G06F 17/30091; G06F 17/30165; G06F 17/30171; G06F 17/30203; G06F 17/3028; G06F 17/30433; G06F 17/30902; G06F 17/30873; G06F 17/30321; G06F 17/30581; G06F 16/2228; G06F 16/275
USPC ...................................................... 707/634
See application file for complete search history.

(56) References Cited

U.S. PATENT DOCUMENTS

| | | | | |
|---|---|---|---|---|
| 3,871,577 A | * | 3/1975 | Avellar | G06F 17/142 708/404 |
| 6,643,641 B1 | * | 11/2003 | Snyder | G06F 17/30864 707/709 |
| 7,882,086 B1 | * | 2/2011 | Wang | G06F 3/0619 707/696 |
| 7,962,689 B1 | * | 6/2011 | Kazar | G06F 3/061 711/100 |
| 8,001,580 B1 | * | 8/2011 | Hyer, Jr. | G06F 17/30171 726/2 |
| 2003/0140035 A1 | | 7/2003 | Burrows | |
| 2005/0055353 A1 | * | 3/2005 | Marx | G08G 1/205 |
| 2007/0101090 A1 | * | 5/2007 | D'Athis | G06Q 20/3552 711/170 |

(Continued)

*Primary Examiner* — Hosain T Alam
*Assistant Examiner* — Saba Ahmed (57) ABSTRACT

A data management system is provided for facilitating in-memory indexing of data based on certain data access modes. The data management system includes an indexing module for indexing data stored in a data memory as a first data index. The first data index is further provided with a first data access mode, wherein the first data access mode enables the first data index to update itself by providing data write privileges to the first data index. The data management system further includes a synchronizing module for synchronizing a second data index with the first data index, wherein the second data access mode is provided with second data access mode to enable external systems to query data. The data management system further includes an index handling module for interchanging data access modes of the first and the second data indexes based on pre-defined rules.

17 Claims, 6 Drawing Sheets

(56) References Cited

U.S. PATENT DOCUMENTS

| | | | |
|---|---|---|---|
| 2007/0143532 A1* | 6/2007 | Gorobets | G06F 3/0607 |
| | | | 711/103 |
| 2008/0077570 A1* | 3/2008 | Tang | G06F 17/30684 |
| 2008/0228772 A1* | 9/2008 | Plamondon | G06F 17/30902 |
| 2008/0228864 A1* | 9/2008 | Plamondon | G06F 17/30902 |
| | | | 709/203 |
| 2010/0250832 A1* | 9/2010 | Zhang | G06F 11/1441 |
| | | | 711/103 |
| 2012/0078859 A1* | 3/2012 | Vaitheeswaran | |
| | | | G06F 17/30864 |
| | | | 707/693 |
| 2012/0131309 A1* | 5/2012 | Johnson | G06F 9/30 |
| | | | 712/41 |
| 2012/0246139 A1 | 9/2012 | Rao | |
| 2013/0173606 A1 | 7/2013 | Pasumarthi et al. | |
| 2013/0226900 A1 | 8/2013 | Sharma et al. | |
| 2013/0283203 A1 | 10/2013 | Batraski et al. | |
| 2013/0325851 A1 | 12/2013 | Crudele et al. | |

* cited by examiner

| Field | Record 1 | Record 2 |
|---|---|---|
| First Name | Mike | John |
| Last name | Jordan | Johnson |
| Number | 111 | 222 |
| Number2 | 333 | 444 |

| Field | Indexed Record |
|---|---|
| First Name | John |

SYSTEM AND METHOD FOR IN-MEMORY INDEXING OF DATA

CROSS-REFERENCE TO RELATED APPLICATIONS

This application claims the benefit of U.S. Provisional Application Ser. No. 61/772,275 filed Mar. 4, 2013, entitled "IN MEMORY INDEXING OF DATA BASED ON THRESHOLDS", which is incorporated herein by reference in its entirety.

BACKGROUND

Field of the Invention

Embodiments of the present invention generally relate to techniques for managing data stored in a memory and particularly to a system and method for in-memory indexing of data based on pre-defined rules.

Description of Related Art

With the ever increasing business of contact centers, responsibilities on the contact centers are also increasing. Further, as customers of the contact centers are increasing, the contact centers are required to hire more agents and supervisors to efficiently provide services to the customers. Therefore, the contact centers are required to handle a huge amount of data corresponding to their customers and employees. A general practice for handling the huge amount of data is to use database management systems that are capable of handling static as well as real time dynamic data. Handling of the real time data is still one of the biggest challenges for the contact centers. This is due to the dynamic nature of the real time data that changes every fraction of a second. The real time data may be used to monitor and handle performance of the contact centers. Additionally, the real time data may also be used to serve requests of the customers of the contact centers.

Fortunately, conventional technologies enable us to store drastically dynamic data into databases. However, the conventional technologies are not advanced enough to handle huge data stored in databases in a very quick and efficient manner. On the other side, expectations of the customers of the contact centers are to view results of their queries in fractions of a second, which is a very quick data access rate for huge databases. As per the present technology, databases may take even more than ten seconds in reproducing a result of a query, which is not a very appreciable time for convincing and attracting new and existing customers of the contact center.

A possible solution for speeding up response time for data queries is to store real time data in primary memories instead of storing in databases. As primary memories shows a much faster response time as compared to the databases, therefore, usage of the primary memories in storing the real time dynamic data is a reliable solution. However, use of the primary memories leads to another problem, which is commonly known as memory locking. The primary memories do not allow simultaneous reading and writing operations on a same memory space. Therefore, a data cannot be updated and read at a same time and further results in increased response time for data queries.

There is thus a need for an improved system and method to provide a platform for storing and accessing the real time dynamic data with very low response time for data queries.

SUMMARY

Embodiments in accordance with the present invention provide a data management system for providing in-memory indexing of data based on data access modes, wherein the data management system comprises an indexing module for indexing data stored in a data memory storage and for storing the indexed data as a first data index. The first data index is further provided with a first data access mode, wherein the first data access mode enables the first data index to update itself by providing data write privileges to the first data index. The data management system further includes a synchronizing module for synchronizing a second data index with the first data index, wherein the second data access mode is provided with second data access mode to enable external systems to query data. The data management system further includes an index handling module for interchanging data access modes of the first and the second data indexes based on pre-defined rules.

Embodiments in accordance with the present invention further provide a computer-implemented method for facilitating in-memory indexing of data based on data access modes. The computer-implemented method includes indexing data stored in a data memory storage and storing indexed data as first data index and second data index, wherein the first data index and the second data index have same indexed data, assigning a first data access mode to the first data index, wherein the first data access mode comprise privilege to write data, assigning a second data access mode to the second data index, wherein the second data access mode comprise privilege to read data, and interchanging the first data access mode of first data index with the second data access mode of the second data index based on one or more pre-defined rules.

Embodiments in accordance with the present invention further provide a computer-implemented method for facilitating in-memory indexing of data based on data access modes. The computer-implemented method includes indexing data stored in a data memory storage and storing indexed data as first data index and second data index, wherein the data stored in the data memory storage is indexed based on one or more pre-defined rules that are configurable by at least one authorized personnel, enabling one or more external systems to query data from the second data index, enabling first data index to update its index after a pre-determined time interval, enabling one or more external systems to query data from the updated first data index, enabling the second data index to synchronize indexed data with the updated first data index, and enabling one or more external systems to query data from the synchronized second data index.

The present invention can provide a number of advantages depending on its particular configuration. First, the present invention provides a method for automatically indexing data stored in a memory based on pre-defined (yet configurable) threshold limits. Second, the present invention provides significantly lower data response time for data queries based on a unique method of using two copies of an index to separately handle data read and data write operations for avoiding memory locking situations.

These and other advantages will be apparent from the disclosure of the present invention(s) contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

The present invention will be illustrated below in conjunction with an exemplary communication system, e.g., the Avaya Aura® system. Although well suited for use with, e.g., a system having an Automatic Call Distribution (ACD) or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

Figure 1:
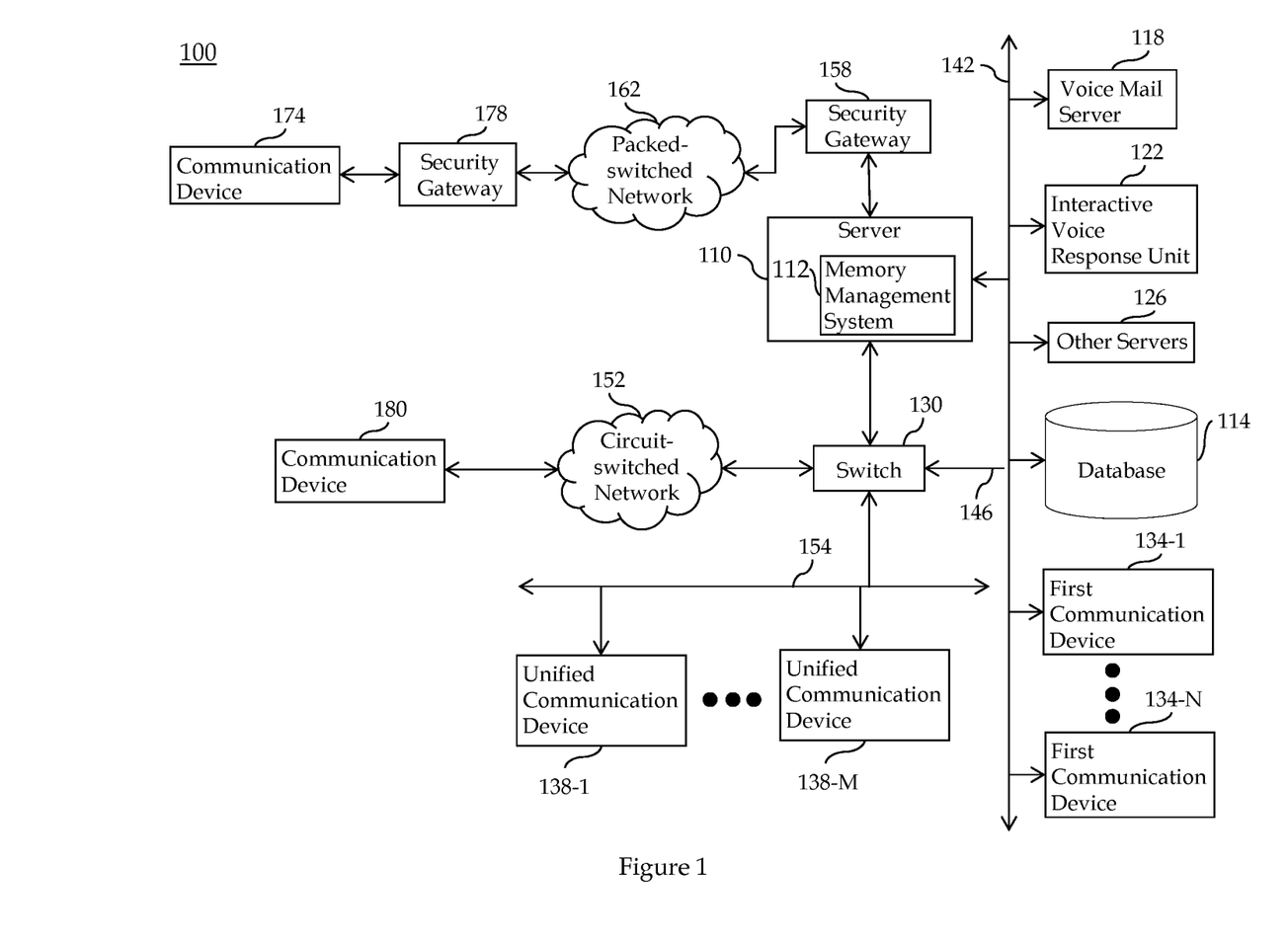
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that may enhance the value and efficiency of the contact processing, and a plurality of servers, namely a voice mail server 118, an Interactive Voice Response unit (e.g., IVR)

122, and other servers 126, a switch 130, a plurality of working agents operating packet-switched (first) communication devices 134-1-N (such as computer work stations or personal computers), and/or circuit-switched (second) communication devices 138-1-M, all interconnected by a local area network (or wide area network WAN) 142.

The plurality of servers may include a voice analyzing capability e.g., a natural language processing system to analyze attributes of incoming voice contacts. The central server 110 includes a data management system 112, according to an embodiment of the present invention. The data management system 112 may be an application stored as a software or firmware. The computed estimated wait time may be stored in a database of the data management system 112. The servers may be connected via optional communication lines 146 to the switch 130. As will be appreciated, the other servers 126 may also include a scanner (which is normally not connected to the switch 130 or Web server), VoIP software, video call software, voice messaging software, an IP voice server, a fax server, a web server, an email server, and the like. The other servers 126 may include servers to receive textual contacts e.g., emails, web chats, social media chats, and instant messages. Further, the other servers 126 may include analysis capability (e.g., suitable software, hardware, firmware or combination of software and hardware) for analyzing attributes of the textual contacts. The switch 130 is connected via a plurality of trunks to a circuit-switched network 152 (e.g., Public Switch Telephone Network (PSTN)) and via link(s) 154 to the second communication devices 138-1-M. A security gateway 158 is positioned between the central server 110 and the packet-switched network 162 to process communications passing between the central server 110 and the packet-switched network 162.

Although the preferred embodiment is discussed with reference to client-server architecture, it is to be understood that the principles of the present invention apply to other network architectures. For example, the present invention applies to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the present invention does not require the presence of packet- or circuit-switched networks.

The switch 130 and/or central server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or central server 110 may be a modified form of the subscriber-premises equipment sold by Avaya Inc. under the names Definity™ Private-Branch Exchange (PBX)-based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company.

Typically, the switch 130 and/or central server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Other types of known switches and servers are well known in the art and therefore not described in detail herein.

The security gateway 158 may be implemented as hardware such as via an adjunct processor (as shown) or as a chip in the server.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched. Each of the communication devices 138-1-M corresponds to one of a set of internal extensions Ext-1-M, respectively. The second communication devices may include, for example, wired and wireless telephones, PDAs (personal digital assistants), H.320 videophones and conferencing units, voice messaging and response units, traditional computer telephony adjuncts, and any other communication device.

It should be noted the present invention does not require any particular type of information transport medium between switch, or server and first and second communication devices, i.e., the present invention may be implemented with any desired type of transport medium as well as combinations of different types of transport channels.

The packet-switched network 162 can be any data and/or distributed processing network, such as the Internet. The packet-switched network 162 typically includes proxies (not shown in the figure), registrars (not shown in the figure), and routers (not shown in the figure) for managing packet flows.

The packet-switched network 162 is in communication with a communication device 174 via a security gateway 178, and the circuit-switched network 152 with an external second communication device 180.

In a preferred configuration, the central server 110, packet-switched network 162, and first communication devices 134 are Session Initiation Protocol or SIP compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized the configuration of the switch, server, user communication devices, and other elements as shown in FIG. 1 is for purposes of illustration only and should not be construed as limiting the present invention to any particular arrangement of elements.

As will be appreciated, the central server 110 is notified via LAN 142 of an incoming contact by the communications component (e.g., switch 130, fax server, email server, web server, and/or other server) receiving the incoming contact. The incoming contact is held by the receiving telecommunications component until the central server 110 forwards instructions to the component to forward or route the contact to a specific contact center resource, such as the IVR unit 122, the voice mail server 118, and/or first or second telecommunication device 134, 138 associated with a selected agent of the contact center 100. The central server 110 distributes and connects these contacts to telecommunication devices of available agents based on the predetermined criteria noted above.

When the central server 110 forwards a voice contact (or first work item) to an agent, the central server 110 also forwards customer-related information from the database 114 to the agent's computer work station for viewing (such as by a pop-up display) to permit the agent to better serve the customer. Depending on the contact center configuration, the central server 110 may forward a list of contacts to an available agent to preview before forwarding the contact itself and the data associated therewith to the agent. The agents process the work items or contacts sent to them by the central server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

Figure 2:
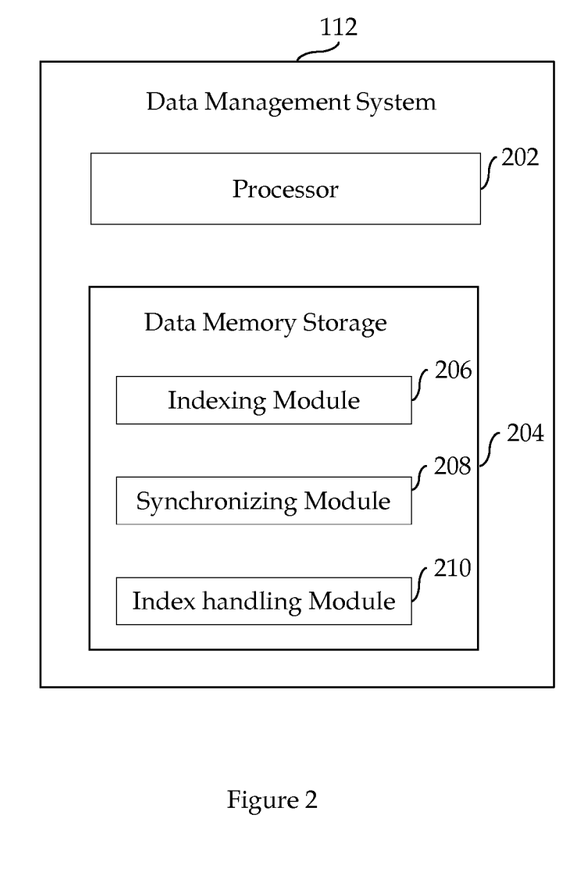
FIG. 2 is a block diagram of a data management system according to an embodiment of the present invention.

FIG. 2 illustrates a block diagram of a data management system 112 according to one embodiment of the present invention. As depicted from the figure, the data management system 112 includes a processor 202 and a data memory storage 204. The data memory storage 204 further includes an indexing module 206, a synchronizing module 208, and an index handling module 210. The modules stored in the data memory storage 204 uses the processor 202 to perform actions, e.g., receiving, storing, and processing data stored in the data memory storage 204. In an embodiment of the present invention, the data memory storage 204 may be a random access memory (RAM) or a primary memory.

The indexing module 206 is configured to receive real time data in various formats from one or more external systems. In an embodiment, the external systems are the systems that communicate over a network with the data management system 112 for accessing data and for storing data into the data memory storage 204. The data management system 112 further indexes the data stored in the external systems to speed up the data accessing by the external systems. Further, in an embodiment, the data inputted to the data memory storage 204 is real time data and the data management system 112 is configured to index the inputted data in real time. Examples of the external systems may include, but are not restricted to, a personal computer, a mobile phone, a smart phone, a Personal Digital Assistant (PDA), a tablet computer, a laptop, and the like.

The indexing module 206 is further configured to store the real time data in the data memory storage 204. The indexing module 206 is further configured to index (in real time) the data stored in the data memory storage 204 based on certain pre-defined indexing rules. In an embodiment of the present invention, the pre-defined indexing rules are stored in the data memory storage 204. In another embodiment of the present invention, the pre-defined indexing rules are stored in a secondary memory (not shown).

Further, the indexing module 206 is configured to store the indexed data in the data memory storage 204 as an index component (hereinafter referred to as 'first data index'). In an embodiment of the present invention, a first data access mode is assigned to the first data index that is stored in the data memory storage 204. The first data access mode may represent a data write only privilege. This may enable the indexing module 206 to update the first data index based on the non-indexed data available in the data memory storage 204. However, the first data index will not be available for being queried by the external systems.

In another embodiment of the present invention, a second data access mode is assigned to the first data index that is stored in the data memory storage 204. The second data access mode may represent a data read only privilege. This may enable the external systems to read the indexed data stored in the first data index. However, the first data index will not be available for updating data. In an exemplary embodiment of the present invention, the first data access mode or the second data access mode are assigned by the index handling module 210. Further, in an embodiment, an application programming interface may be required to allow the external systems to query the indexed data.

In an embodiment of the present invention, the first data index is created to speed up the data access process for the data stored in the data memory storage 204. It is known in the art that indexing of data minimizes response time for data read queries. Further, in an exemplary embodiment of the present invention, the indexing module 206 may use pre-defined indexing algorithms for indexing the data stored in the data memory storage 204. The pre-defined algorithms may be configured to use the pre-defined indexing rules for indexing (in real time) the data stored in the data memory storage 204. The pre-defined indexing rules may comprise rules that describe a threshold, which leads to an index. Further, the pre-defined indexing rules may be configurable by one or more authorized personnel e.g., by an administrator. The administrator may use a user interface to access and update the pre-defined indexing rules. Significance of the pre-defined indexing rules is further detailed in conjunction with FIGS. 4A and 4B of the present invention.

Exemplary embodiments of the present invention enables the indexing module 206 to assign first data access mode to the first data index and second data access mode to the second data index for updating the first data index. Further, the indexing module 206 may be configured to use a pre-defined indexing algorithm for indexing the data stored in the data memory storage.

The synchronizing module 208 is configured to create a replica (hereinafter referred to as "second data index") of the first data index and store it in the data memory storage 204. The synchronizing module 208 is further configured to monitor the first data index to determine if the first data index is getting updated or not. In case if the synchronizing module 208 determines that the first data index is updated by the indexing module 206, then the synchronizing module 208 starts synchronizing the second data index with the first data index.

In an embodiment of the present invention, the second data index is assigned with the first data access mode. As described previously, the first data access mode may represent a data write only privilege. This may enable the synchronizing module 208 to synchronize the second data index with the first data index (which involves writing of data in the second data index). However, the second data index will not be available to the external systems for reading or querying index information. In an embodiment of the present invention, the synchronizing module 208 may be configured to update the second data index based on the update process of the first data index. In another embodiment of the present invention, the synchronizing module 208 may be configured to update the second data index after a pre-determined time interval (that may be defined by authorized personnel, such as administrators).

In another embodiment of the present invention, the second data index is assigned with the second data access mode. As described previously, the second data access mode may represent a data read only privilege. This may enable the external systems to read and query data from the second data index. However, the second data index will not be available for synchronization. In an embodiment, an application programming interface may be required to allow the external systems to query the indexed data.

Further, in an embodiment of the present invention, the external systems do not have privileges to directly update (or write) index information of the first and the second data index under the first and the second access modes. Further, only the indexing module 206 may have privileges to update the first data index. Furthermore, only the synchronizing module 208 may have a privilege to update the second data index. However, the indexing module 206 may be configured to update the first data index based on new data added by the external systems in the data memory storage 204.

The index handling module 210 is configured for interchanging the data access modes of the first and the second data index based on one or more pre-defined rules. For example, in case if non-indexed data in the data memory storage 204 is monitored by the index handling module 210, then the index handling module 210 may assign the first data access mode to the first data index and second data access mode to the second data index. This may assign data write privileges to the first data index and data read privileges to the second data index, which may further enable the external systems to query required data from the second data index and may enable the indexing module 206 to update the first data index based on the non-indexed data available in the data memory storage 204.

Further, after completion of update process of the first data index, the index handling module 210 may instruct the synchronizing module 208 to start synchronizing the second data index. Simultaneously, the index handling module 210 may assign first data access mode to the second data index and second data access mode to the first data index. This access mode interchange is necessary to enable the synchronizing module 208 to read data from the first data index and write the data into the second data index for synchronizing data between the first data index and the second data index. Further, this access mode interchange is also necessary to ensure that the external systems will get uninterrupted data read access from either of the first data index or the second data index.

In an exemplary embodiment of the present invention, the index handling module 210 is configured to ensure that at least one of the first data index or the second data index always remain accessible by the external systems for querying data. Further, if any one of the first or the second data index is required to be updated then the index handling module 210 may assign data read privileges to the other data index and may assign data write privileges to the data index that is required to be updated. Hence, no particular data index may be locked for the external systems to query data, which may result in lower data response time (unlike the present technology that required locking of memory data for either read or write operations). Similarly, immediate update of the first or the second data index may be initiated as one of the data index is always available for update process.

Figure 3:
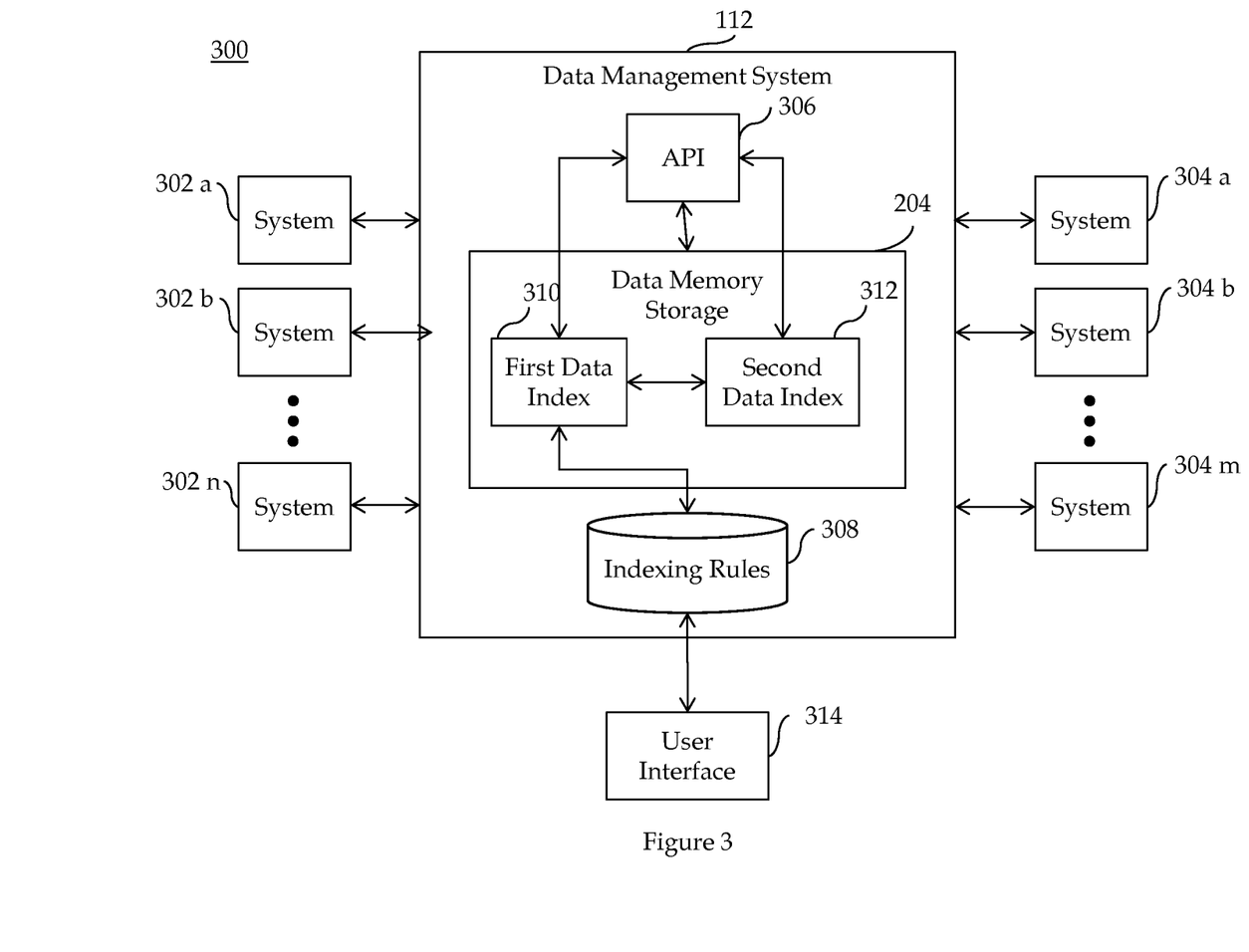
FIG. 3 illustrates an exemplary environment in which various embodiments of the present invention are implemented.

FIG. 3 illustrates an exemplary environment 300 where various embodiments of the present invention are implemented. The environment 300 includes a data management system 112 connected to a plurality of external systems 302-a-n and 304-a-n via a network (not shown). The external systems may also be referred to as client devices. Hereinafter, the external systems 302-a-n may collectively be referred to as "external systems 302" and the external systems 304-a-m may collectively be referred to as "external systems 304". Further, the external systems 302 and 304 may refer to electronic devices that may be utilized by users to access the data management system 112. In an embodiment, the data management system 112 may be implemented on a server. In another embodiment, the data management system 112 may be implemented on a client device.

Examples of the external systems 302 and 304 may include, but are not restricted to, a personal computer, a mobile phone, a smart phone, a personal digital assistant (PDA), a tablet computer, a laptop, and the like. Further, the network (not shown) through which the external systems 302 and 304 are connected with the data management system 112 may include, but is not restricted to, a communication network such as Internet, PSTN, Local Area Network (LAN), Wide Area Network (WAN), Metropolitan Area Network (MAN), and so forth.

In an exemplary embodiment of the present invention, as shown in the FIG. 3, the external systems 302 may be connected to the data management system 112 for inputting data into the data memory storage 204 of the data management system 112. In an embodiment, the data memory storage 204 is a primary memory, e.g., a random access memory. Further, the external systems 304 may be connected to the data management system 112 for reading/querying data stored into the data memory storage 204 of the data management system 112. In an embodiment, an Application Programming Interface (API) 306 is required to allow the external systems to query the data stored in the data memory storage 204.

Since, data stored in the data memory storage 204 is being read and written simultaneously, the data stored in the data memory storage 204 may be locked to perform one of the read or write operation at a time, and the other operation may be sent in queue to wait for the ongoing operation to finish. This memory locking process leads to poor response time for data read operations and data write operations. Therefore, to overcome the memory locking issue, the data stored in the data memory storage 204 is indexed in real time and the real time indexed data is further stored in the data memory storage 204 (shown as first data index 310).

In an embodiment of the present invention, the data stored in the data memory storage 204 is indexed based on certain pre-determined indexing rules 308. The indexing rules 308 may include an indexing algorithm and other rules required for indexing the data stored in the data memory storage 204. In an embodiment of the present invention, the indexing rules may be configurable by at least one authorized personnel (e.g., an administrator) by using a user interface 314.

In an exemplary embodiment of the present invention, the first data index 310 enables the external systems 304 to access the stored data in significantly lower data response time. However, the external systems 302 may continue inputting data into the data memory storage 204. In an embodiment, the API 306 is required to allow the external systems to query the indexed data from the data memory storage 204. Further, as the external systems 302 are continuously inputting new data into the data memory storage 204, the first data index 310 is also required to be continuously updated. As the first data index 310 is further being continuously enquired by the external systems 304, updating the first data index 310 may again put the external systems 304 on hold.

To overcome this situation, a copy of the first data index 310 is created and stored in the data memory index (shown as second data index 312). Therefore, in case the first data index 310 is required to be updated, the data management system 112 route the data read queries of the external systems 304 from the first data index 310 to the second data index 312. This relives the first data index 310 from the burden of responding to the external systems 304. Therefore, as all of the data read queries of the external systems 304 are being handled by the second data index 312, the first data index 310 may be updated by indexing the non-indexed data available in the data memory storage 204. In an embodiment, the first data index 310 may be scheduled to update after every pre-determined time interval. In another embodiment, the first data index 310 may be updated based on availability of the non-indexed data in the data memory storage 204.

Furthermore, as the first data index 310 is updated, and the external systems 304 may need to query the updated data, the data management system 112 may then re-route the data read queries of the external systems 304 to the first data index 310. This relives the burden of the second data index 312 of responding to the queries of the external systems 304. Therefore, the second data index 312 can also be updated without any intervention from the external systems 304.

In an embodiment of the present invention, the data management system 112 synchronize the second data index 312 with the first data index 310, which involved data reading from the first data index 310 and data writing in the second data index 312. Therefore, either of the first data index 310 or the second data index 312 never bears simultaneous data read and data write operations to avoid memory locking situations. Therefore, data response time to the external systems 304 reduces further to significant levels. After completion of the synchronizing process, the data management system 112 may re-route the data read requests from the external systems 304 to the second data index 312 to allow the first data index 310 to again update its indexed data. This data update and synchronizing process may trigger after every pre-determined time interval or based on the non-indexed data availability in the data memory storage 204.

In another embodiment of the present invention, the second data index 312 may also update its index by indexing non-indexed data available in the data memory storage 204. After completing the update process, the data management system 112 may again route the data read requests of the external systems 304 to the second data index 312 and enable the first data index 310 to update its index. This process of interchanging data read and data write operations may be triggered after every pre-determined time interval. Further, the operation interchange process may enable both the first data index 310 and the second data index 312 to remain updated and also allow smooth data access to the external systems 304 with very low data response time.

Figure 4A:
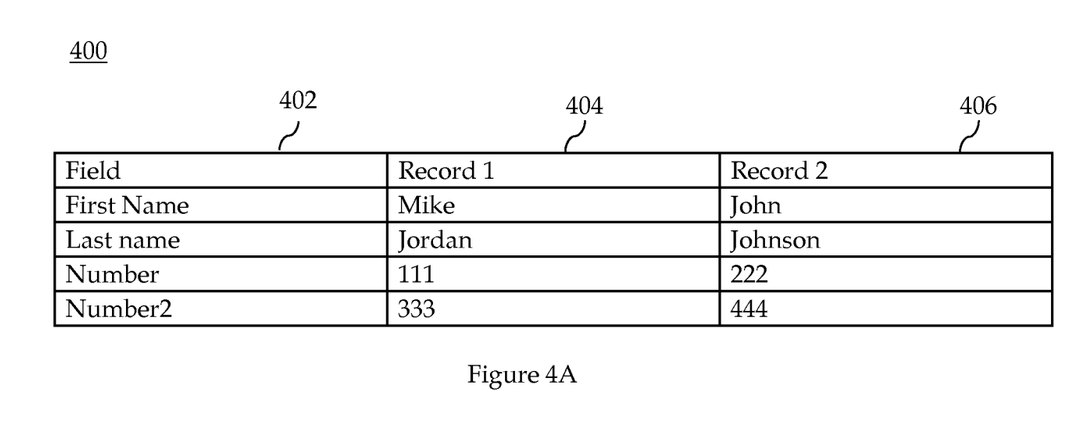
FIG. 4A illustrates an exemplary data structure of a database for storing non-indexed information in a data memory storage, in accordance with an embodiment of the present invention.

FIG. 4A illustrates an exemplary data structure 400 of a database for storing non-indexed information in a data memory storage, in accordance with an embodiment of the present invention. Further, in an embodiment, the non-indexed information is inputted by one or more external systems (as described in conjunction with FIG. 3 of the present invention). As shown, a column 402 represents field information related to the data stored in the rows of the data structure 400. Column 404 represents first record stored in the data structure 400. Column 406 represents second record stored in the data structure 400. It may be appreciated by a person skilled in the art that the data structure shown in the FIG. 4A of the present invention is only for the descriptive purpose and a real data structure may have many more data fields and data records.

Figure 4B:
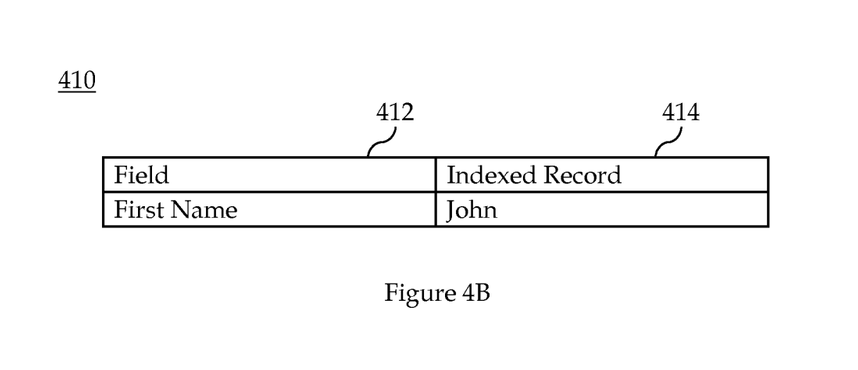
FIG. 4B illustrates an indexed data structure of a database for storing indexed information in the data memory storage, in accordance with an embodiment of the present invention.

FIG. 4B illustrates an exemplary data structure 410 of a database for storing indexed information of the data structure 400 in the data memory storage, in accordance with an embodiment of the present invention. In an embodiment of the present invention, the indexed data structure 410 is derived from the non-indexed data structure 400 based on one or more indexing rules. For example, as shown in the FIGS. 4A and 4B, the data structure 410 is created from the data structure 400 based on an indexing rule of indexing all records having 'Number'>200. Such indexing rules may be pre-defined based on certain threshold limits. For example, certain thresholds for indexing may include, indexing of all records having 'Number2'<300 or indexing all records having 'last name'='jordon' etc.

In an embodiment, the indexing rules may be pre-defined. In another embodiment of the present invention, the indexing rules may be configured by one or more authorized personnel using a user interface. Further, in case if one of the external systems queries the database via an application programming interface to retrieve all records having 'Number'>200, the instead of processing the data structure 400, the database may directly provide the indexed data structure 410 to the requestor external system.

Figure 5A:
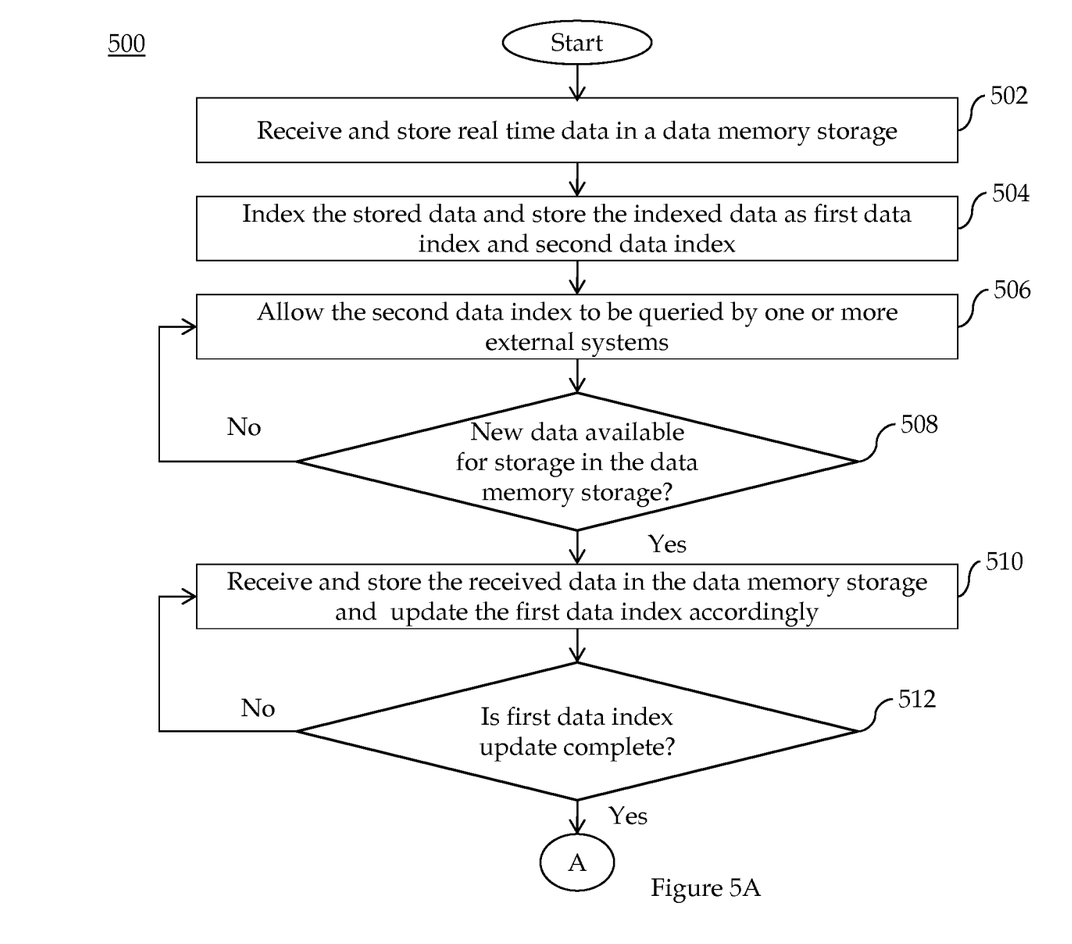
FIGS. 5A and 5B are a flow diagram of a method for facilitating in-memory indexing of the data, in accordance with an embodiment of the present invention.
Figure 5B:
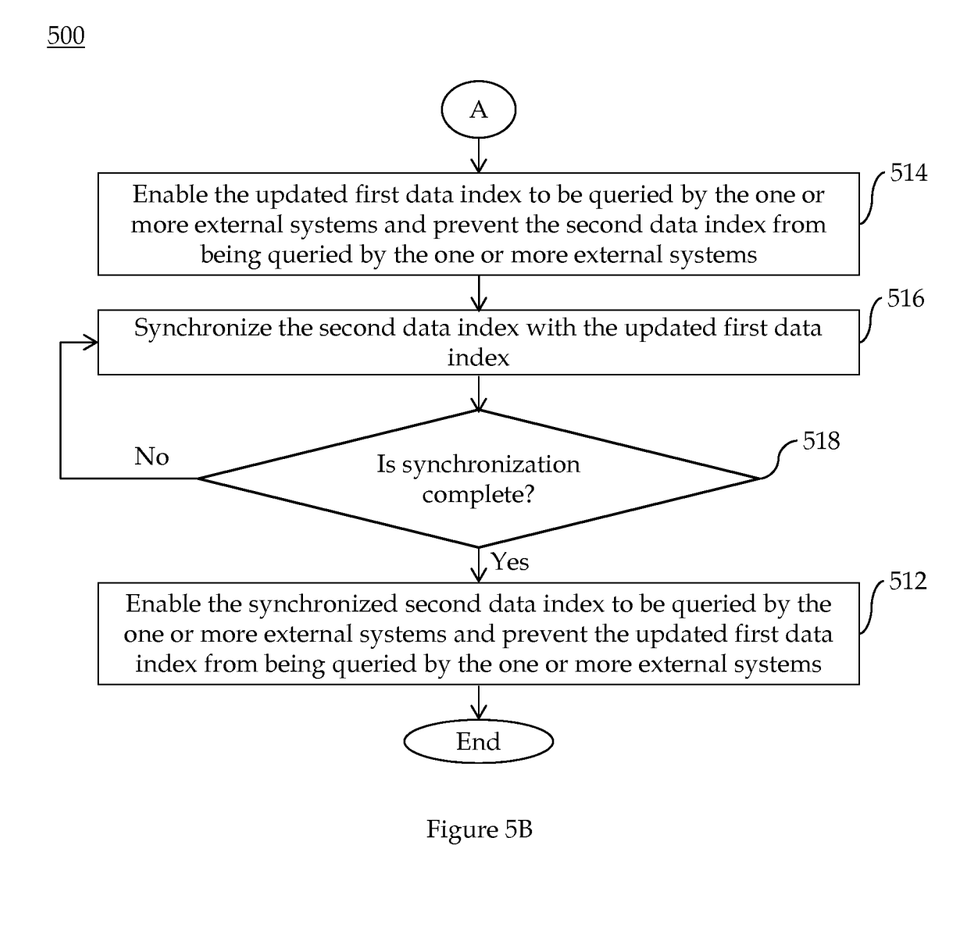

FIGS. 5A and 5B illustrates a method 500 for facilitating memory indexing of data based on data access modes, in an exemplary embodiment of the present invention. The method 500 includes indexing data stored in a data memory storage and storing indexed data as first data index and second data index, wherein the first data index and the second data index have same indexed data, assigning a first data access mode to the first data index, wherein the first data access mode comprise privilege to write data, assigning a second data access mode to the second data index, wherein the second data access mode comprise privilege to read data, and interchanging the first data access mode of first data index with the second data access mode of the second data index based on one or more pre-defined rules. In an embodiment, the pre-defined rules may include indexing algorithm and indexing rules based on which the data is indexed. Further, in an embodiment of the present invention, a user interface may be used by one or more authorized personnel to configure the pre-defined rules.

At step 502, a data management system (such as the data management system 112 described in the FIGS. 2 and 3 of the present invention) may receive data from one or more external systems (client devices) that are connected to the data management system via a network. The data management system then stores the received data into its data memory storage. In an embodiment of the present invention, the data memory storage is a primary memory (e.g., a random access memory). Further, in an embodiment of the present invention, the data management system receives and stores the data in real time. Moreover, an application programming interface may be required to enable the external systems to input data into the data memory storage.

At step 504, the data management system indexes the data stored in the data memory storage using a pre-defined indexing algorithm and certain pre-defined indexing rules. The data management system is further configured to store the indexed data into the data memory storage as a first data index and a second data index, wherein the second data index is a copy of the first data index. In an embodiment of the present invention, the data management system indexes the data stored in the data memory storage to enable lower data response time to the external systems.

At step 506, the data management system allows external systems to query data from the second data index, wherein the external systems may query the data stored in the data memory storage and the data management system may use the second data index to provide suitable data to the requesting external system. Further, in an embodiment, an application interface may be required for enabling the external systems to query data from the data management system. In an embodiment of the present invention, the first data index is protected to be accessed by the external systems as the first data index is saved for updating index by indexing any new data that is inputted by the external systems.

At step 508, the database management system determines whether any external system is trying to update or add data into the data memory storage. In case, if the data management system determines that one or more of the external systems are trying to add or update data in the data memory storage then the method 500 proceeds towards step 510. Otherwise the method 500 returns to the step 506.

At step 510, the data management system receives new data from the external systems and updates the data storage memory accordingly. Thereafter, as the data in the data storage memory is updated, there is also a need to update the indexed data to ensure that the external systems querying the data management system always receive updated data for their data queries. Further, as the second data index is assigned the work of responding queries of the external systems, the second data index cannot be used to update index. Therefore, the first data index is assigned (by the data management system) the work of indexing the non-indexed data available in the data storage memory. In an embodiment, the process of updating data indexes is scheduled repeatedly after a pre-determined time interval.

At step 512, the data management system determines whether the update process of the first data index is completed. In case if the data management system determines that the first data index is updated then the method 500 proceeds towards step 514 (as shown in FIG. 5B). Otherwise, the method 500 returns to the step 510.

At step 514, the data management system relieves the second data index from being accessed by the external systems for data queries. The data management system further assigns the responsibility of processing data queries of the external systems on the first data index. This step is necessary to ensure that the external systems are provided with the updated data (considering the first data index is has updated index information which is not available in the second data index).

At step 516, the data management system determines the second data index is not updated and requires an update. Therefore, the data management system enables the second data index to read index information from the first data index and synchronize with the first data index. This step will update the second data index. In another embodiment of the present invention, the data management system may also enable the second data index to update its index information by indexing non-indexed data available in the data memory storage. Further, this step ensures the first data index is only handling data read requests and not data write requests. This further ensures smooth and fast data access by the external systems.

At step 518, the data management system determines whether or not the synchronizing process of the second data index is completed. In case, if the data management system determines that the second data index is synchronized with the first data index then the method 500 proceeds towards step 520. Otherwise, if the data management system determines that the synchronizing process in not completed then the data management system may allow the second data index to update by returning the method 500 towards the step 516.

At step 520, the data management system relives the first data index from being queried by the external systems and routs all data read requests of the external systems to the second data index. This step ensures that the first data index is relived from data read requests and can be used to update index information to ensure that if, meanwhile, more data is updated by the external systems into the data memory storage then the newly updated data must also be indexed. Thus, the data management system enables the first data index to scan the data memory storage to determine non-indexed data for indexing. After completing the index update process the first data index will again be updated unlike the second data index. The data management system may again rout the data read queries of the external systems to the first data index and may enable the second data index to synchronize with the first data index. This cycle of updating index information and synchronizing the index copy to provide updated services to the external systems may continue as per requirements.

The exemplary systems and methods of this present invention have been described in relation to a contact center. However, to avoid unnecessarily obscuring the present invention, the preceding description omits a number of known structures and devices. This omission is not to be construed as a limitation of the scope of the present invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or Estimated Wait Time (EWT) computing system and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a Estimated Wait Time (EWT) computing system, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above.

This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:
1. A data management system for providing in-memory indexing of data based on data access modes, the data management system comprising:
   a memory device storing executable instructions; and
   a processor in communication with the memory device, wherein executing the executable instructions by the processor causes the processor to:
      store, in a primary memory, data received from a first external system;

index the data stored in the primary memory and store the indexed data as a first data index in the primary memory, wherein the first data index is assigned with a first data access mode, wherein the first data access mode comprises a data write only privilege;

after indexing the data stored in the primary memory, synchronize a second data index, stored in the primary memory, with the first data index, wherein the second data index is assigned with a second data access mode different than the first data access mode; and before synchronizing the second data index, interchange the first data access mode of the first data index with the second data access mode of the second data index based on one or more pre-defined rules, wherein the second data access mode comprises a data read only privilege.

2. The data management system of claim 1, wherein the one or more pre-defined rules comprise assigning the second data access mode to the second data index and the first data access mode to the first data index for updating the first data index.

3. The data management system of claim 1, wherein:
assignment of the second data access mode to the first data index enables the first data index to be queried by a second external system; and
assignment of the second data access mode to the second data index enables the second data index to be queried by the second external system.

4. The data management system of claim 3, wherein executing the executable instructions by the processor causes the processor to:
provide an application programming interface for querying data from the one of the first data index and the second data index assigned with the second data access mode.

5. The data management system of claim 1, wherein executing the executable instructions by the processor causes the processor to:
assign the first data access mode to the first data index and the second data access mode to the second data index; and
subsequently update the first data index.

6. The data management system of claim 1, wherein executing the executable instructions by the processor causes the processor to:
assign the second data access mode to the first data index and the first data access mode to the second data index; and
subsequently synchronize the second data index with the first data index.

7. The data management system of claim 1, wherein executing the executable instructions by the processor causes the processor to:
use a pre-defined indexing algorithm for indexing the data stored in the primary memory.

8. The data management system of claim 7, wherein the indexing algorithm is configured to use pre-defined rules for indexing data stored in the primary memory.

9. The data management system of claim 8, wherein the pre-defined rules are configurable by at least one authorized personnel.

10. The data management system of claim 1, wherein the primary memory is a random access memory.

11. The data management system of claim 1, wherein executing the executable instructions by the processor causes the processor to:
trigger an update of the first data index after a pre-determined time interval.

12. The data management system of claim 1, wherein executing the executable instructions by the processor causes the processor to:
trigger a synchronizing process of the second data index after completion of an updating process of the first data index.

13. A computer-implemented method for facilitating in-memory indexing of data based on data access modes, the method comprising:
indexing, by a computer, data stored in a primary memory and storing indexed data in the primary memory as a first data index and a second data index, wherein the first data index and the second data index have the same indexed data;
assigning, by the computer, a first data access mode to the first data index, wherein the first data access mode comprises a data write only privilege;
assigning, by the computer, a second data access mode to the second data index, wherein the second data access mode comprises a read only privilege;
updating, by the computer, the first data index based on additional data received from a first external system;
interchanging, by the computer, the first data access mode of first data index with the second data access mode of the second data index; and
after interchanging, synchronizing, by the computer, the second data index with the updated first data index.

14. The method of claim 13, wherein the first data index is regularly updated after a pre-set time interval.

15. The method of claim 13, wherein the data stored in the primary memory is indexed based on pre-defined rules that are configurable by at least one authorized personnel.

16. The method of claim 13, wherein:
assignment of the second data access mode to the first data index enables the first data index to be queried by a second external system; and
assignment of the second data access mode to the second data index enables the second data index to be queried by the second external system.

17. A computer-implemented method for facilitating in-memory indexing of data, the method comprising:
indexing, by a computer, data stored in a primary memory and storing indexed data as a first data index and a second data index,
wherein the data stored in the primary memory is indexed based on one or more pre-defined rules that are configurable by at least one authorized personnel; and
wherein the first data index is assigned a first data access mode comprising a data write only privilege and the second data index is assigned a second data access mode comprising a data read only privilege;
routing, by the computer, a query for data received from a first external system, to the second data index;
updating, by the computer, the first data index after a pre-determined time interval;
after updating the first data index, assigning, by the computer,
the second data access mode to the first data index; and
the first data access mode to the second data index;
routing, by the computer, a query for data received from a second external system, to the updated first data index;
synchronizing, by the computer, the second data index with the updated first data index;

after synchronizing the second data index, assigning, by the computer,
the first data access mode to the first data index; and
the second data access mode to the second data index;
routing, by the computer, a query for data from a third external system, to the synchronized second data index.

* * * * *

UNITED STATES PATENT AND TRADEMARK OFFICE
CERTIFICATE OF CORRECTION

PATENT NO. : 11,163,736 B2
APPLICATION NO. : 14/194222
DATED : November 2, 2021
INVENTOR(S) : Shtilman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2020 days.

Signed and Sealed this
Thirtieth Day of August, 2022

Katherine Kelly Vidal
*Director of the United States Patent and Trademark Office*